(12) United States Patent
Nagy et al.

(10) Patent No.: US 7,898,425 B2
(45) Date of Patent: Mar. 1, 2011

(54) TRACKING SYSTEM OF HUMAN BEINGS, ANIMALS OR OBJECTS

(75) Inventors: Samara Nehmi Nagy, Sao Paulo (BR); Sabina Nehmi De Oliveira, Sao Paulo (BR); Attila Arpad Nagy, Sao Paulo (BR)

(73) Assignee: Samara Nehmi Nagy, Sao Paulo (BR)

(*) Notice: Subject to any disclaimer, the term of this patent is extended or adjusted under 35 U.S.C. 154(b) by 230 days.

(21) Appl. No.: 12/278,168

(22) PCT Filed: Jan. 31, 2007

(86) PCT No.: PCT/BR2007/000021
§ 371 (c)(1),
(2), (4) Date: Aug. 4, 2008

(87) PCT Pub. No.: WO2007/090254
PCT Pub. Date: Aug. 16, 2007

(65) Prior Publication Data
US 2009/0027193 A1    Jan. 29, 2009

(30) Foreign Application Priority Data
Feb. 6, 2006    (BR) .................................. 0600472

(51) Int. Cl.
*G08B 23/00* (2006.01)
(52) U.S. Cl. .................................................. 340/573.1
(58) Field of Classification Search ............. 340/573.1, 340/573.3, 572.1, 539.13; 600/301
See application file for complete search history.

(56) References Cited

U.S. PATENT DOCUMENTS

| | | | | |
|---|---|---|---|---|
| 5,458,123 A * | 10/1995 | Unger | ......................... | 600/509 |
| 6,113,539 A * | 9/2000 | Ridenour | ..................... | 600/300 |
| 6,402,692 B1 | 6/2002 | Morford | | |
| 6,819,258 B1 | 11/2004 | Brown | | |
| 6,917,797 B1 | 7/2005 | Hoppa | | |
| 6,919,979 B2 | 7/2005 | Seki et al. | | |
| 7,525,426 B2 * | 4/2009 | Edelstein et al. | ....... | 340/539.13 |
| 2003/0151524 A1 * | 8/2003 | Clark | ..................... | 340/870.07 |
| 2004/0021573 A1 | 2/2004 | Hoffman et al. | | |
| 2005/0017901 A1 | 1/2005 | Koptiev | | |
| 2005/0033515 A1 * | 2/2005 | Bozzone | ..................... | 701/214 |
| 2005/0186938 A1 * | 8/2005 | Hunter | ..................... | 455/404.2 |

(Continued)

FOREIGN PATENT DOCUMENTS

DE    19726938    1/1999

(Continued)

*Primary Examiner* — Phung Nguyen
(74) *Attorney, Agent, or Firm* — Baker Donelson Bearman Caldwell & Berkowitz PC

(57) ABSTRACT

The present invention is about a tracking system of human beings suitable for geographical and temporal identification of all individuals to be benefited by the system. The tamper-proof tracking system of human beings, according to the invention, comprises: a) one or more transceiver devices located inside the body to be tracked, capable of storing and/or transmitting information of an individual's positioning; b) information collecting and transmitting network, for data sent by the transceiver elements, which may include satellite stations; c) portable or mobile devices for immediate personal identification; d) sub-centers or sub-stations, for simultaneous and immediate availability of data; e) central site for storing all data picked up and transmitted by the collecting network.

24 Claims, 1 Drawing Sheet

U.S. PATENT DOCUMENTS

2005/0250440 A1* 11/2005 Zhou et al. .................. 455/12.1
2007/0139187 A1* 6/2007 Dobosz .................. 340/539.11

FOREIGN PATENT DOCUMENTS

| GB | 2398687 | 8/2004 |
|----|---------|--------|
| WO | 9620464 | 4/1996 |
| WO | 9808204 | 2/1998 |
| WO | 03067541 | 8/2003 |
| WO | 2004068387 | 8/2004 |
| WO | 2005018250 | 2/2005 |
| WO | 2005122755 | 12/2005 |

* cited by examiner

TRACKING SYSTEM OF HUMAN BEINGS, ANIMALS OR OBJECTS

TECHNICAL FIELD

The present invention is about a tracking system of human beings, animals or objects, suitable for geographical and temporal identification of all individuals to be benefited by the system.

BACKGROUND OF THE INVENTION

Tracking systems of objects are known already.

Document US 2004021573 is describing a security and signaling system, submitting an audible signal to a person in state of emergency, combined with a locating system, as to alert and instruct the person appropriately according to his necessities and localize the same. The system is composed of a portable signaling unit, including a receiver of GPS (global positioning system) for pinpointing the location of said signaling unit; a cellular phone antenna adapted for transmitting a signal by making use of the digital CDPD (cellular digital packet data) technology; a transmission control center, distant from the portable signaling unit, adapted to transmit a control signal; and a cellular phone, able to receive a signal CDPD from the portable unit and retransmit it to the transmission control center, thus establishing a digital communication between the control center and the signaling unit; the CDPD signal includes GPS data, corresponding to the location of the portable signaling unit.

U.S. Pat. No. 6,819,258 introduces a means of locating a person by a subscriber system, attaching a locating unit to the person going to be located and this locating unit is calculating the position of the person at any time. The system includes a provider, connected to a communication network, like Internet, where the provider connects a readout computer, which is accessible by the subscriber from a remote computer terminal. A computer program at the provider is receiving a locating signal of the subscriber, transmitting the locating contact to the locating unit the person is carrying. The computer program includes instructions, incorporated in the codes-identifying computer, for automatic transmission of the locating solicitation to the subscriber terminal, where the position of a person is being indicated.

US Patent 2005017901 is about a tracking system and security, composed of relays-equipped stations, installed in divers geographical regions, being that every single station is configured to receive and send electronic signals by using a transmitter; furthermore are being incorporated at least one portable electronic communication unit that includes means for the transmission of an electronic signal that can be received from at least one of the relays stations, where the transmitted electronic signal in question is adding identification information of the portable electronic communication unit, transmitting automatically the coordinates to the electronic communication unit; at least one portable locating unit, adapted for receiving electronic signals transmitted from the relays stations, where the coordinates of the position for each portable electronic unit are being received by this portable locating unit. This electronic device for personal use may be in form of a wristwatch, bracelet or pendants, being dressed or carried by the user and/or article to be monitored and located. The system is also adapted for transmitting the locating coordinates in regular intervals for designating location units, like cellular phones or police units.

US Patent 2005033515 is about an individual tracking system, consisting of a wireless unit and a navigation system. The tracking system is composed of a wireless communication device with attached pedometer and electronic compass, positioned in relation to the pedometer. It also comprises a GPS unit connected to the device, as to indicate the latitude and longitude, and a server being in communication with the wireless communication device, where the information about position is transmitted from the wireless communication device to the server, attending a solicitation of position. The locating method is carried out by the receipt of data from the pedometer and an electronic compass, thus defining the location of a person by using those data and transmitting them in reply to a message with the position by using the wireless communication device, that could be a cellular phone or a mobile radio.

Document WO 2005018250 is pointing out an individual locating method, including a system for monitoring location of individuals, like the parolees (individuals in liberty on conditional basis), comprising a device that can be used by the individual and a portable device connected to the first one. The portable device is being interconnected with a monitoring system through a wireless telephone network. The portable device transmits periodically to the monitoring system locating information in cryptography, as well as information of position through the wireless network. The monitoring system is tracing the location of the individual and will alert the corresponding authorities, when the individual is violating rules or laws.

U.S. Pat. No. 6,917,797 is describing a personal equipment of safe signaling, consisting in the first place of a wireless communication unit for transmitting emergency signals via radio; a wireless connection for receiving the emergency signals via radio. This connection is able to send the existing emergency signal to a monitoring center via a second wireless connection. Said monitoring center is capable to determine the location of the first wireless connection via trilateration of the first emergency signal by radio and alert an emergency vehicle through a conventional method of alert. The equipment comprises, furthermore, a microphone and an audible communication medium, established with the aid of the microphone and the wireless connection.

The majority of prior art that have been found are trying to solve problems of the developed countries. One does not notice an understanding of the reality of some emerging countries in terms of the necessity of total safety for all.

The trackings systems registered to date show points of vulnerability, in case of kidnappings or various other situations as, for example:

Systems where the transceiver is installed only in accessories, like: in bracelets, anklets, belts, necklaces, etc, can be removed against the will of the bearer.

The aforementioned corporal transceivers do not have a memory; they do not store data and are limited as to the area covered, depending on the existence of cellular phone towers and other mediums.

In said systems, the alarm signal is only given when the bearer is leaving the area of coverage, and after that tracking becomes impossible with the same system.

Former systems record only immediate personal identification, they do not have an information storage center with historical data on each individual's movements over a period of a minimum of 5 years.

Not a single system, so far, encompasses two sources of memory storage, being the first one in the bodily transceivers themselves and the second one in the data centers. The information from both will be compared, thus eliminating any margin for doubt and creating a higher degree of confidence.

The former systems do not have portable sensing devices, used exclusively by the police, for immediate personal identification.

SUMMARY OF THE INVENTION

The present invention comprises a tracking system of human beings, animals or objects, comprised of:
a) one, two or more transceiving micro-devices, located on or within a body to be tracked, capable of storing and/or transmitting positioning information of the body, and capable of communicating and cooperating among themselves; specifically characterized by the fact that the plurality of transceiving micro-devices, associated with their ability to communicate and cooperate among themselves, is used for detecting and signalizing data of any attempt of removal, violation or destruction of, or tampering with, any of the said transceiving devices;
b) information collecting network, for collecting data transmitted by the transceiver devices;
c) optionally, portable or mobile devices for immediate personal identification;
d) sub-centers or sub-stations for simultaneous and immediate availability of data; and
e) storing center or central site for all data picked up and transmitted by the information collecting network.

Objects, features and advantages of the present invention will become apparent upon a reading of the following detailed description in conjunction with the drawings and the appended claims.

DETAILED DESCRIPTION

Figure 1:
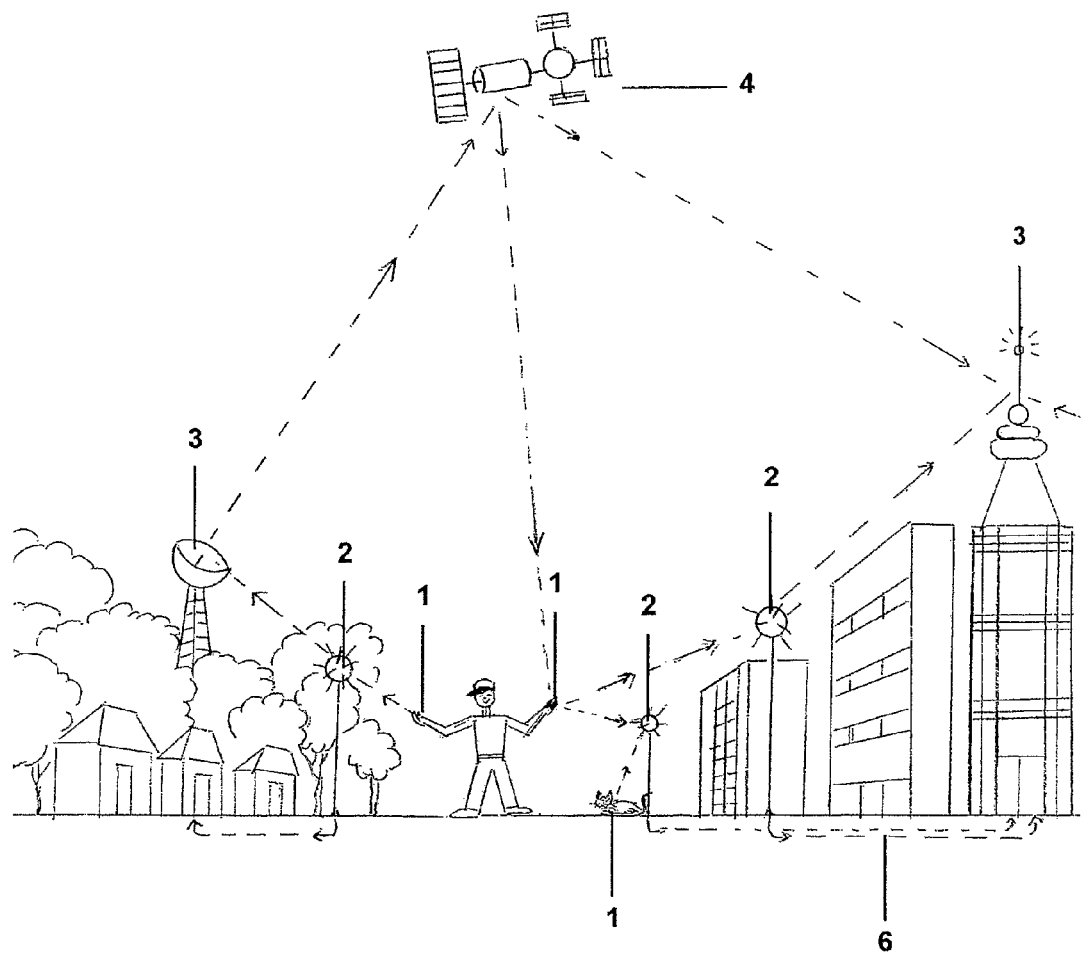
FIG. 1 illustrates the components of the system and their interactions.

The tracking system developed by the applicants has the following advantages:
It is the first system designed to work on both regional and global scale, since the systems available to date are elitist, i.e., they are intended for a restricted class of population, for the safety of a few, or else are directed to inmate control. The invention envisages the safety of all people involved, not excluding anybody. It presents a system seeking social inclusion, regarding the rights of everybody with respect to their safety and their integrity, independent of their financial situation.
For being comprehensive, it can inhibit violence and illegal practices in general, and help create a greater consciousness of unity, of limits and of cooperative practices.
For being inclusive, the system may bring forth social changes in terms of valuating ethic attitudes and solidarity.
One can notice a clear concern in the related to prior art, in not applying methods that could appear invasive in terms of each individual's privacy, avoiding to look like a "big brother". On the contrary, our system does not conceive this type of concern. Like any new paradigm, we are anticipating the inevitable worldwide population growth on a planet increasingly marked by social inequality and exclusion. Such facts may lead to even more uprisings, onslaughts and violence.
To date there is no system capable of forecasting public administration needs. The system, according to the invention, permits collecting and checking of statistical data at any moment.
The previous systems do not present resources, nor do they have capability for demographic research and/or studies on internal and external migratory movements.
Our system only, will permit the immediate monitoring of all that information and contribute to an agile administration, promptness and precise actions.

The system, according to the invention, permits tracking, informing the exact position of an individual on the earth's surface by means of the geographical coordinates, and additionally, recording this information for a long period of time.

It has been developed for the purpose of tracking human beings, being equipped with one or more transceivers, that could be carried hidden on or inserted in the human body, capable of communicating among each other and with the central system, which on its part is counting with a proper memory and thus offering the following possibilities of practical application:
Locating persons in case of disappearance, kidnapping.
Locating troops and prisoners in case of war.
Locating and identifying bodies in catastrophes, earthquakes, avalanches, tsunamis, fires and terrorist attacks.
Research work of statistical and demographical data.
Identity verification aimed at the penal and criminal areas, serving as irrefutable legal evidence.
Tracking of slave traffic and illegal immigration.
Identifying the authors of terrorist attacks.
Identifying the driver in cases of traffic violations.
Calling for help in cases of emergency or situations of danger.
Inhibiting the action of corrupt police agents.
Personal security.
Social inclusion, dealing with minorities needs.
Capacity to immediately detect emergency situations.
Clarifying agrarian questions, and property or land disputes.
Containing of abuses and violence.
Availability of an extremely extensive base of personal data, that can be compared with data from other sources, for logic redundancy.
Providing greater safety for the financial system, for commerce in general, museums, etc.
Identifying the authors of environmental crimes.

The invention is about a system capable of tracking and furnishing the exact position of any person at any time and at any place on earth's surface. It comprises basically one or more transceivers, implanted in the human body or carried in accessories (dental prosthesis, orthopedic pivots, subcutaneous regions, intra-uterine devices, etc) and connected to satellites and data communication antennas. The transceivers communicate among each other in the human body, in order to prevent removal or tampering with, and they receive and emit information via radio waves. They have their own memory. All information related to the personal individual movements, is collected and recorded in data centers, remaining available and safeguarded for at least 5 years.

THE TRACKING SYSTEM OF HUMAN BEINGS, according to the invention, is comprised of:
a) One or more transceiver devices, located within the body to be tracked and capable of recording and/or transmitting positioning information of the body;
b) Network for collecting the information sent by the transceiver devices, said network may include stations for transmitting information to the satellites;
c) Optionally, portable or mobile equipment for immediate personal identification;
d) Sub-centers or sub-stations for simultaneous and immediate availability of data;

e) Storing center of all data picked up and transmitted by the collecting network.

FIG. 1 attached shows the components of the system and their interactions, as listed hereunder:

One, two or more transceiver devices (1) and (7), capable of receiving and transmitting radio frequency signals. They are also connected to satellites (4) by the GPS system, or other connection systems. The devices inserted into the human body (1) communicate among each other and will emit alarm signals at the slightest attempt of their removal or in case of a dangerous situation. The said devices have their own memory and, therefore, they also store positioning and time of the day information (and movement in general), which may or may not be cryptographed. Those transceivers can be powered by diverse energy sources, as for example, the body heat, they can be charged at recharge stations for internal transceivers, or from a cellular phone, or portable equipment for this purpose, or through the contact with magnetized or heated objects, or through the movement of the body itself, among other possibilities. The monitored person or animal is identified by a personal code, which is associated with a data base with unique information of personal identification, as for example: blood type, genetic information, or genome, or characteristics of the iris, or fingerprints, etc.

The transceiver devices consist of communication mini-systems, and may be similar to GPS technology mini-cellular-phones, with internal memory and components for global geographical positioning such as GPS receivers, optionally with short distance wireless communication technology, like "Bluetooth", or with a satellite communication micro-base-station, or with other technology capable of performing the same functions. The individual information is recorded systematically, at pre-selectable time intervals (like per second, or every minute, etc).

Information collecting and recording network (2), sends and receives signals to be transmitted via data communication network or even via terrestrial cabling (6) to a data storing center (3). The said information collecting and recording network can also receive and send information via satellites (5). The said network may consist of GSM technology cellular base stations, or equipment based on other technology capable of executing the same function. The information recorded by the transceiver devices is sent via wireless data communication technology, through the collecting network, to a central site where all data is stored.

According to the invention, the collecting network can be equipped with fixed and/or mobile stations, located on land, on the sea or in the air, or even in space. Part of the collecting network may be composed of GSM technology cellular base stations, or other equipment capable of executing the same function. The collecting network may operate through wireless data communication systems as well as wired or cable connected systems (for example, the electric power distribution network, optical fiber cables, or others).

Portable sensing and transmitting devices will also be part of the network, with the intended purpose of immediate identification, thus serving as information base for the police, fire brigades, public administration, or others. They can be installed in mobile vehicles. The said devices may be automobile installed cellular base stations, or else equipment of any other technology capable of executing the same function. As examples we can mention: portable or mobile devices for immediate personal identification, cellular base stations installed, for example, in automobiles, portable computers like "PDAs" or "palmtops" equipped with "Bluetooth"-like short distance wireless communication technology, or others with another technology capable of executing the same function.

Information storing center (3), tracks, records and files, for at least 5 years, all the information about individual movement: latitude and longitude with accuracy (degrees, minutes, seconds and hundredths of a second), and the corresponding times of the day. The latitude and longitude data (with precision up to one hundredth of a second), allow an accuracy of approximately one meter for the position of the person, animal or object.

The transceiver device employed in the tracking system, according to the invention, may have tamper-proof characteristics. It is inserted into the organism of the person or animal, preferably in the subcutaneous region, and more preferably in the wrists. The system is safe, because it allows comparison of data stored in the storing center with that of the transceiver elements and it can be tamper-proof, when located internally, as mentioned above. The transceiver devices communicate among each other and signalize the central site and/or sub-center station of any attempt of their removal or violation.

Should any transceiver device (1) be removed from the human body, the system will detect it, because two or more of these devices inserted into the human body cooperate with and communicate among each other. These transceivers receive and emit radio signals. They are also tracked by satellites, therefore, the satellites (4) integrate the system, too. The system could be operated from any point of the Earth's surface. Each transceiver possesses a personalized code, able to be tracked and identified by satellite, collecting networks, or radio waves. The system, therefore, will have both vertical and horizontal tracking capability. Highways, railroads, waterways, ships, subway stations, tollgates, avenues, public places, residential buildings and condominiums, public buildings, shopping centers, banks, schools, universities, international borders, rural areas, etc, will have nuclei of human tracking and transmission of information to the data centers. Airports, ports, bus terminals and train stations will also have installed sensing devices within the data collecting network.

Police agents will carry portable sensors. The special function of those sensors will be to identify persons in a quicker way. They will also be used in cases of violation or removal of the bodily transceivers. Due to the fact that the identification code can be crossed with unique biological identification data of the individual, in case of substitution of the transceiver with another person or animal, the system will accuse such violation, because the data or personal characteristics like: iris, fingerprints or genome, will not match. The system enables the police or judicial authorities to constitute proof in cases of lack of material evidence.

The transmission of the positioning information between the monitored elements and the data transmission network is executed by way of one or more communication media, either wired or wireless, according to what is available.

The integrity of the information will also be guaranteed by the logical redundancy, i.e., it will be possible to compare the positioning data obtained through the coordinates stored in the memories of the transceivers as well as in the data center, with the information recorded in known reference points, like shopping centers, banks, cities, etc. The system can be employed for confirming alibis or even as evidence, particularly in the financial area, for example: the fact of a person having been at a place using credit or debit card, making use of a bank ATM, writing out checks, etc, forming an integral information system, with one hundred percent 100% precise, reliable and safe data.

The data collecting and transmission network is capable of picking up, storing and transmitting to a data center, all the information sent by the transceiver devices about each individual's positioning and movement and/or acting together with satellite stations and furthermore sub-stations for emergency or periodical inquiry, which can deliver personal positioning data at any moment.

The bodily transceivers (1) will follow the principles of bio-safety, thus not being harmful to human health. They can be Teflon® coated or with other carbon compositions or make use of hybrid systems, like Nan technology and biotechnology. Independent of the type of technology employed, the transceivers' size may range from 1 millimeters down to a fraction of a millimeter, according to the characteristics of the body to be tracked.

The transceivers will be able to receive locating information via satellite (4). The data collecting network (2) will receive the information from the transceivers, forwarding it to a data storing center (3) or also to satellites (4).

The data storing center (3) and the collecting network (2), will be safe and tamper-proof. The system, according to the invention, allows comparison of the recorded information in the data center or of the collecting network with the information stored in the memory of the transceiver elements themselves. Pedometers can be employed together with the data collecting and transmitting network, which will assist by means of triangulation to register the individual's displacement in relation to each station.

The system, according to the invention, is offering a tracking capacity and/or global integration that may include diverse types of terrestrial, aerial and maritime environments.

The examples to follow are being given to elucidate in a more explicit manner the scope of the invention, however, they are not to be taken as a limiting factor of the invention.

Example 1

Individual "A" had been implanted with two internal transceivers (GSM technology "mini-cellular" type, with internal memory and a GPS receiver), capable of receiving, transmitting and storing information. The personalized code of individual "A" had been stored in both transceivers. During the experiment, the system of receivers (a GSM technology cellular network) tracked the movement of the individual during a period of 12 hours. The internal transceivers were transmitting to the cellular network, in predetermined intervals, positioning and date/hour information all along the route followed by individual "A" during this period.

Table 1 below shows some time points with the corresponding recorded positioning data of the individual, on 27 Oct. 2002.

Individual "A", on the selected time points below, had been located in the following positions:

TABLE 1

| Individual | Date | Hour | Latitude | Longitude |
|---|---|---|---|---|
| A | 27/10/05 | 10 h 30 | 23°33'10.25"S | 46°38'30.59"W |
| A | 27/10/05 | 10 h 35 | 23°34'43.73"S | 46°38'21.78"W |
| A | 27/10/05 | 10 h 40 | 23°34'54.18"S | 46°38'48.12"W |
| A | 27/10/05 | 10 h 45 | 23°34'59.05"S | 46°38'59.02"W |
| A | 27/10/05 | 10 h 50 | 23°35'09.36"S | 46°39'11.42"W |
| A | 27/10/05 | 10 h 55 | 23°35'15.43"S | 46°39'22.98"W |
| A | 27/10/05 | 11 h 00 | 23°35'29.09"S | 46°39'34.88"W |

TABLE 1-continued

| Individual | Date | Hour | Latitude | Longitude |
|---|---|---|---|---|
| A | 27/10/05 | 11 h 05 | 23°35'35.65"S | 46°39'45.90"W |
| A | 27/10/05 | 11 h 10 | 23°35'49.47"S | 46°39'56.65"W |

The result matches with the initially agreed-on route, i.e. moving southwest, with recording intervals of 5 minutes.

Example 2

Individual "B" had been implanted with two internal transceivers (GSM technology "mini-cellular" type, equipped with "Bluetooth"-like technology, with internal memory and a GPS receiver), each having received, transmitted and stored information and communicated among each other. The personalized code of individual "B" had been stored in both transceivers. At the exact place and time, previously agreed-on, individual "B" would try to remove one or more of the internal transceivers.

According to what had been agreed-on, at the same exact place and time, the system of receivers (GSM technology cellular network), received an alarm of transceiver violation. The exact sequence of events was as follows:

individual "B" removed transceiver Y;

transceiver Y transmitted a message of violation directly to the cellular network;

simultaneously, as an additional safety measure, transceiver Y transmitted a message of violation to transceiver X as well;

transceiver X, on its turn, retransmitted the message of violation to the cellular network.

The alert has been active, i.e., it occurred by way of transceiver Y sending a violation message (via "Bluetooth"-like technology) to transceiver X. In contrast, the alert could have been passive, i.e., the absence of signal from transceiver Y could have been interpreted by transceiver X as being an alarm of violation. This would have been the case, if the attempt of removal of transceiver Y had resulted in its deactivation or even physical destruction. It is important to notice that transceiver X (which had neither been removed nor violated) continued storing and transmitting the positioning and date/time information.

At the moment of the alert, the receivers had registered the following data:

TABLE 2

| Type of signal | Day | Hour | Latitude | Longitude |
|---|---|---|---|---|
| Normal | 28/10/05 | 10 h 00 | 23°34'38.01"S | 46°38'54.98"W |
| Normal | 28/10/05 | 10 h 01 | 23°34'38.08"S | 46°38'55.14"W |
| Normal | 28/10/05 | 10 h 02 | 23°34'38.23"S | 46°38'55.68"W |
| Normal | 28/10/05 | 10 h 03 | 23°34'38.23"S | 46°38'55.68"W |
| Normal | 28/10/05 | 10 h 04 | 23°34'38.23"S | 46°38'55.68"W |
| Normal | 28/10/05 | 10 h 05 | 23°34'38.23"S | 46°38'55.68"W |
| Normal | 28/10/05 | 10 h 06 | 23°34'38.23"S | 46°38'55.68"W |
| Normal | 28/10/05 | 10 h 07 | 23°34'38.23"S | 46°38'55.68"W |
| Normal | 28/10/05 | 10 h 08 | 23°34'38.23'S | 46°38'55.68"W |
| Normal | 28/10/05 | 10 h 09 | 23°34'38.23"S | 46°38'55.68"W |
| Normal | 28/10/05 | 10 h 10 | 23°34'38.23"S | 46°38'55.68"W |
| Normal | 28/10/05 | 10 h 11 | 23°34'38.23"S | 46°38'55.68"W |
| Alert | 28/10/05 | 10 h 12 | 23°34'38.23"S | 46°38'55.68"W |
| No signal | 28/10/05 | 10 h 13 | — | — |

Alert of removal of transceiver "Y", at position 23°34'38.23"S and 46°38'55.68"W at 10 h12 from individual "B".

After the signal of alert, the following measures as per the predetermined protocol have automatically been taken:
  first of all contact with the individual himself was attempted by calling his cellular phone;
  the call was answered and the individual confirmed the intentional removal of the transceiver.

Example 3

Individual "B" had been implanted with two internal transceivers (GSM technology "mini-cellular" type, equipped with "Bluetooth"-like technology, with internal memory and a GPS receiver), each having received, transmitted and stored information, and communicated among each other. The personalized code of individual "B" had been stored in both transceivers. At the exact place and time, previously agreed-on, individual "B" would try to remove one or more of the internal transceivers, however, this time without answering the telephone call of the immediate search. According to what had been agreed-on, at the same exact place and time, the system of receivers (GSM technology cellular network), received an alarm of transceiver violation. The exact sequence of events was as follows:
  individual "B" removed transceiver Y;
  transceiver Y transmitted a message of violation directly to the cellular network;
  simultaneously, as an additional safety measure, transceiver Y transmitted a message of violation to transceiver X as well;
  transceiver X, on its turn, retransmitted the message of violation to the cellular network.

At the moment of the alert, the receivers had registered the following data:
  Alert of removal of transceiver "Y", at position 23°31'60.36"S and 46°40'51.70"W from individual "B", at 10 h18 on Nov. 3, 2005.

TABLE 3

| Type of signal | Day | Hour | Latitude | Longitude |
| --- | --- | --- | --- | --- |
| Normal | 03/11/05 | 10 h 00 | 23°31'60.36"S | 46°40'51.70"W |
| Normal | 03/11/05 | 10 h 01 | 23°31'60.36"S | 46°40'51.70"W |
| Normal | 03/11/05 | 10 h 02 | 23°31'60.36"S | 46°40'51.70"W |
| Normal | 03/11/05 | 10 h 03 | 23°31'60.36"S | 46°40'51.70"W |
| Normal | 03/11/05 | 10 h 04 | 23°31'60.36"S | 46°40'51.70"W |
| Normal | 03/11/05 | 10 h 05 | 23°31'60.36"S | 46°40'51.70"W |
| Normal | 03/11/05 | 10 h 06 | 23°31'60.36"S | 46°40'51.70"W |
| Normal | 03/11/05 | 10 h 07 | 23°31'60.36"S | 46°40'51.70"W |
| Normal | 03/11/05 | 10 h 08 | 23°31'60.36"S | 46°40'51.70"W |
| Normal | 03/11/05 | 10 h 09 | 23°31'60.36"S | 46°40'51.70"W |
| Normal | 03/11/05 | 10 h 10 | 23°31'60.36"S | 46°40'51.70"W |
| Normal | 03/11/05 | 10 h 11 | 23°31'60.36"S | 46°40'51.70"W |
| Normal | 03/11/05 | 10 h 12 | 23°31'60.36"S | 46°40'51.70"W |
| Normal | 03/11/05 | 10 h 13 | 23°31'60.36"S | 46°40'51.70"W |
| Normal | 03/11/05 | 10 h 14 | 23°31'60.36"S | 46°40'51.70"W |
| Normal | 03/11/05 | 10 h 15 | 23°31'60.36"S | 46°40'51.70"W |
| Normal | 03/11/05 | 10 h 16 | 23°31'60.36"S | 46°40'51.70"W |
| Normal | 03/11/05 | 10 h 17 | 23°31'60.36"S | 46°40'51.70"W |
| Alert | 03/11/05 | 10 h 18 | 23°31'60.36"S | 46°40'51.70"W |
| Nosignal | | | | |

Alert of removal of transceiver "Y", at position 23°31'60.36"S and 46°40'51.70"W from individual "B", at 10 h18 on Nov. 3, 2005, as shown in table 3 above.

After the signal of alert, the following measures as per the predetermined protocol have automatically been taken:
  first of all contact with the individual himself was attempted by calling his cellular phone;
  the call was not answered;
  Contact was established with persons from the individual's list of names to be contacted in case of an alert, for checking his/her known personal schedule or for even contacting him/her;
  As the contacted persons had no idea of the whereabouts of the individual, the police and the individual's personal security were mobilized.

Example 4

Individual "C" had been implanted with two internal transceivers (GSM technology "mini-cellular" type, equipped with "Bluetooth"-like technology, with internal memory and a GPS receiver), each having received, transmitted and stored information, and communicated among each other. The personalized code of individual "C" had been stored in both transceivers. Individual "C" would move around in an area not covered by the receiver system (GSM technology cellular network), however, he had to follow a pre-established route. The established time for the course was one hour.

The data received through the receivers is listed in table 4 below, in intervals of 5 minutes:

TABLE 4

| Type of signal | Day | Hour | Latitude | Longitude |
| --- | --- | --- | --- | --- |
| Normal | 30/10/05 | 11 h 30 | 23°35'37.30"S | 46°38'37.18"W |
| Normal | 30/10/05 | 11 h 35 | 23°35'37.72"S | 46°38'37.20"W |
| Normal | 30/10/05 | 11 h 40 | 23°35'38.02"S | 46°38'37.21"W |
| Normal | 30/10/05 | 11 h 45 | 23°35'38.38"S | 46°38'37.29"W |
| Normal | 30/10/05 | 11 h 50 | 23°35'38.50"S | 46°38'37.28"W |
| Normal | 30/10/05 | 11 h 55 | 23°35'38.75"S | 46°38'37.27"W |
| No signal | 30/10/05 | 12 h 00 | | |
| No signal | 30/10/05 | 12 h 05 | | |
| No signal | 30/10/05 | 12 h 10 | | |
| No signal | 30/10/05 | 12 h 15 | | |
| No signal | 30/10/05 | 12 h 20 | | |
| Normal | 30/10/05 | 12 h 25 | 23°35'38.59"S | 46°38'37.29"W |
| Normal | 30/10/05 | 12 h 30 | 23°35'38.29"S | 46°38'37.27"W |
| Normal | 30/10/05 | 12 h 35 | 23°35'38.16"S | 46°38'37.14"W |
| Normal | 30/10/05 | 12 h 40 | 23°35'37.10"S | 46°38'37.12"W |

At the end of the period, after the return of individual "C", the information stored in the memory of the internal transceivers was read by way of a portable computer ("palmtop" type) equipped with "Bluetooth"-like technology. It was confirmed that the stored data of movement and time was consonant with what had been previously established. Table 5 below shows these data:

TABLE 5

| Type of signal | Day | Hour | Latitude | Longitude |
| --- | --- | --- | --- | --- |
| Normal | | | | |
| Normal | | | | |
| Normal | | | | |
| Normal | | | | |
| Normal | | | | |
| Normal | | | | |
| No signal | 30/10/05 | 12 h 00 | 23°35'39.01"S | 46°38'37.29"W |
| No signal | 30/10/05 | 12 h 05 | 23°35'39.22"S | 46°38'37.10"W |
| No signal | 30/10/05 | 12 h 10 | 23°35'39.41"S | 46°38'37.03"W |
| No signal | 30/10/05 | 12 h 15 | 23°35'39.60"S | 46°38'38.98"W |
| No signal | 30/10/05 | 12 h 20 | 23°35'39.19"S | 46°38'37.02"W |
| Normal | | | | |
| Normal | | | | |
| Normal | | | | |
| Normal | | | | |

Example 5

Individual "E" had been implanted with two internal transceivers (of GSM technology "mini-cellular" type, equipped with "Bluetooth"-iike technology, with internal memory and a GPS receiver), each having received, transmitted and stored information, and communicated among each other. The personalized code of individual "E" had been stored in both transceivers. The individual would be tracked by a cellular base station type mobile localizer, installed in a "pick-up" type of vehicle. The mission of individual "E" was to hide in a pre-determined place, more precisely in the underground garage of a residential building.

Without knowing in which building individual "E" would be, the mobile localizer tracked the whole city block, at a speed of 1 m/2 s (1 meter every 2 seconds).

At about 11 h06, the mobile localizer identified the presence of individual "E" through the personalized code and obtained the following information: Personalized code of individual "E"=S22461983.

TABLE 6

| Code | Date | Hour | Latitude | Longitude |
|---|---|---|---|---|
| — | 10/11/05 | 11 h 05 | — | — |
| S22461983 | 10/11/05 | 11 h 06 | 23°31'59.65"S | 46°40'50.84"W |
| — | 10/11/05 | 11 h 07 | — | — |
| — | 10/11/05 | 11 h 08 | — | — |

Example 6

Individual "X" had been implanted with two internal transceivers (GSM technology "mini-cellular" type, equipped with "Bluetooth"-like technology, with internal memory and a GPS receiver), each having received, transmitted and stored information, and communicated among each other. The personalized code of individual "X" had been stored in both transceivers. Additionally, individual "X" carried, attached to the waist belt, a portable transceiver of the type used by the "Iridium" communication system, capable of receiving and transmitting information directly through satellites, as well as via "Bluetooth"-like technology. At around 12 h00 noon on Dec. 3, 2005, individual "X" would move to an area not covered by the receiver system (GSM technology cellular network).

The data received via cellular network is listed in table 7 below:

TABLE 7

| Code | Date | Hour | Latitude | Longitude |
|---|---|---|---|---|
| AS350 | 03/12/05 | 11 h 40 | 24°31'10.78"S | 48°40'41.58"W |
| AS350 | 03/12/05 | 11 h 45 | 24°31'59.33"S | 48°46'50.65"W |
| AS350 | 03/12/05 | 11 h 50 | 23°32'14.10"S | 48°48'09.28"W |
| No signal | 03/12/05 | 11 h 55 | — | — |
| No signal | 03/12/05 | 12 h 00 | — | — |
| No signal | 03/12/05 | 12 h 05 | — | — |

In contrast, the data received through the satellite network is shown in table 8 below:

TABLE 8

| Code | Date | Hour | Latitude | Longitude |
|---|---|---|---|---|
| AS350 | 03/12/05 | 11 h 40 | 24°31'10.78"S | 48°40'41.58"W |
| AS350 | 03/12/05 | 11 h 45 | 24°31'59.33"S | 48°46'50.65"W |
| AS350 | 03/12/05 | 11 h 50 | 23°32'14.10"S | 48°48'09.28"W |
| AS350 | 03/12/05 | 11 h 55 | 24°33'16.06"S | 48°40'42.02"W |
| AS350 | 03/12/05 | 12 h 00 | 24°34'57.09"S | 48°39'17.20"W |
| AS350 | 03/12/05 | 12 h 05 | 24°35'14.10"S | 48°38'09.28"W |

Example 7

A group of individuals, all of them carrying internal transceivers, as mentioned in the previous examples, had their positioning data stored every second. One of them had been selected to stay in a "Faraday cage". From that moment (of entering the cage) onward, any detection and storing of information about his/her whereabouts had been interrupted. The rest of the group continued to be systematically tracked.

This test had been carried out to demonstrate that a person, if kidnapped and enclosed in a Faraday cage, having consequently lost its contact with the system, will leave behind an important trace for the police, through his personal and location data (positioning of the individual itself), and the location of the accompanying persons at the very moment the system lost its signal or contact.

The invention claimed is:

1. A tracking system of human beings, animals or objects, comprised of:
    a) one, two or more transceiving micro-devices, located on or within a body to be tracked, capable of storing and/or transmitting positioning information of the body, and capable of communicating and cooperating among themselves; specifically characterized by the fact that the plurality of transceiving micro-devices, associated with their ability to communicate and cooperate among themselves, is used for detecting and signalizing data of any attempt of removal, violation or destruction of, or tampering with, any of the said transceiving devices;
    b) information collecting network, for collecting data transmitted by the transceiver devices;
    c) optionally, portable or mobile devices for immediate personal identification;
    d) sub-centers or sub-stations for simultaneous and immediate availability of data; and
    e) storing center or central site for all data picked up and transmitted by the information collecting network.

2. The tracking system of human beings, animals or objects according to claim 1, characterized by the fact that the transceiver devices have their own memory and are capable of systematically recording positioning information, over a freely selectable length of time.

3. The tracking system of human beings, animals or objects according to claim 2, characterized by the fact that the transceiver elements consist of communication mini-systems with internal memory and devices for global geographical positioning.

4. The tracking system of human beings, animals or objects according to claim 3, wherein communications mini-systems are GSM technology mini-cellular phones, optionally with short distance wireless communication technology, or with a satellite communication micro-base-station, or with a wireless communications technology.

5. The tracking system of human beings, animals or objects according to claim 1, characterized by the fact that the transceiver elements consist of communication mini-systems with internal memory and devices for global geographical positioning.

6. A tracking system of humans beings, animals or objects according to claim 5, wherein the communications mini-systems are GPS receivers or GSM technology mini-cellular phones, optionally with short distance wireless communication technology, or with a satellite communication micro-base-station, or with a wireless communication technology.

7. The tracking system of human beings, animals or objects according to claim 1, characterized by the fact that all information recorded by the transceiver devices is transmitted, via wireless data communication technology, through a collecting network, to a storing center for all recorded data.

8. The tracking system of human beings, animals or objects according to claim 1, characterized by the fact that the collecting network is equipped with fixed and/or mobile stations, located on land, on the sea or in the air, or even in space.

9. The tracking system of human beings, animals or objects according to claim 1, characterized by the fact that the transceiver devices may have diverse dimensions and shapes, with sizes ranging from millimeters down to a fraction of a millimeter, in accordance with the characteristics of the body to be tracked.

10. The tracking system of human beings, animals or objects according to claim 1, characterized by the fact of comprising a data collecting and transmission network capable of picking up, storing and transmitting to a central site, all the information forwarded by the transceiver devices about each individual's positioning and movement, and/or operating along with satellite stations and furthermore substations for emergency or periodical consultation, which can deliver personal positioning data at any moment.

11. The tracking system of human beings, animals or objects according to claim 1, characterized by the fact of being able to employ, as a part of the collecting network, GSM technology cellular base stations, or other devices capable of executing the same function.

12. The tracking system of human beings, animals or objects according to claim 1, characterized by the fact of the collecting network being able to operate through wireless data communication systems as well as wired or cable connected systems.

13. The tracking system of human beings, animals or objects-according to claim 12, wherein the wired or cable connected systems comprise an electric power distribution network, optical fiber cables, or a wire or cable communication network.

14. The tracking system of human beings, animals or objects according to claim 1, characterized by the fact of being able to employ as portable or mobile devices for immediate personal identification a cellular radio base station, portable computers, PDA devices, or plamtopo devices each equipped with short distance wireless communication technology or wireless communication technology.

15. The tracking system of human beings, animals or objects according to claim 1, characterized by the fact of employing portable devices for immediate identification of persons, intended exclusively for the legal authorities, to be used on borders, highways, ports and airports, or other places, as well serving to catch someone in the act made by police, thus enabling instantaneous identification of the individual.

16. The tracking system of human beings, animals or objects according to claim 1, characterized by the fact of comprising a data storing center, for the purpose of saving information about precise positioning of each individual at time intervals of free choice.

17. The tracking system of human beings, animals or objects according to claim 1, characterized by the fact of allowing comparison of information stored in the data storing center with information stored in the transceiver devices themselves.

18. The tracking system of human beings, animals or objects according to claim 1, characterized by the fact that the transceiver devices carry personal identification codes, with the possibility of accessing biological or specific information for identifying an individual or animal.

19. The tracking system of human beings, animals or objects-according to claim 18, wherein the biological or specific information for identifying an individual or animal comprises iris, fingerprints, or genome.

20. The tracking system of human beings, animals or objects according to claim 1, characterized by the fact of the geographical indications being preferentially comprised of latitude and longitude, preferentially showing degrees, minutes, seconds and hundredths.

21. The tracking system of human beings, animals or objects according to claim 1, characterized by the fact of the time indications being: day, month, year, hour, minute and second.

22. The tracking system of human beings, animals or objects according to claim 1, characterized by the fact that the transceiver micro-devices are preferentially inserted in hidden places inside the body of the individual.

23. The tracking system of human beings, animals or objects according to claim 1, characterized by the fact of possessing the ability for global tracking and/or integration, which may include diverse types of environments like: terrestrial, aerial and maritime.

24. A tracking system of humans beings, animals or objects according to claim 1, where the methods for detecting an attempt of removal, violation or destruction of, or tampering with, any of the transceiving devices comprises:
   a) cessation of communication between any two of the transceiving devices located on or in the same body;
   b) detected change of the physical distance between any two of the transceiving devices;
   c) detected change of a physical quantity related to the environment where the transceiving device is located.

* * * * *